(12) United States Patent
Ross et al.

(10) Patent No.: US 11,348,477 B2
(45) Date of Patent: May 31, 2022

(54) MOBILE AIRCRAFT SIMULATION SYSTEM AND METHOD

(71) Applicant: ROSS AND KENDALL TECHNOLOGIES LLC, Everett, WA (US)

(72) Inventors: Jeff Ross, Everett, WA (US); Grant Kendall, Everett, WA (US)

(73) Assignee: ROSS AND KENDALL TECHNOLOGIES LLC, Everett, WA (US)

( * ) Notice: Subject to any disclaimer, the term of this patent is extended or adjusted under 35 U.S.C. 154(b) by 0 days.

(21) Appl. No.: 17/148,972

(22) Filed: Jan. 14, 2021

(65) Prior Publication Data

US 2021/0225191 A1    Jul. 22, 2021

Related U.S. Application Data

(60) Provisional application No. 62/962,796, filed on Jan. 17, 2020.

(51) Int. Cl.
*G09B 9/08* (2006.01)
*A62C 99/00* (2010.01)
*G09B 9/14* (2006.01)

(52) U.S. Cl.
CPC .......... *G09B 9/085* (2013.01); *A62C 99/0081* (2013.01); *G09B 9/14* (2013.01)

(58) Field of Classification Search
CPC .. G09B 9/08; G09B 9/085; G09B 9/14; A62C 99/00; A62C 99/0081
See application file for complete search history.

(56) References Cited

U.S. PATENT DOCUMENTS

| 4,526,548 | A | | 7/1985 | Livingston |
| 5,415,551 | A | * | 5/1995 | Semenza ............ A62C 99/0081 434/226 |
| 5,509,806 | A | | 4/1996 | Ellsworth |
| 5,688,136 | A | * | 11/1997 | Rogers ............... A62C 99/0081 434/226 |
| 5,888,069 | A | | 3/1999 | Romanoff et al. |
| 6,106,298 | A | * | 8/2000 | Pollak .................... G09B 9/003 434/29 |

FOREIGN PATENT DOCUMENTS

RU            108684 U1    9/2011

OTHER PUBLICATIONS

International Search Report and Written Opinion dated Apr. 16, 2021, Patent Application No. PCT/US2021/013366, 9 pages.

* cited by examiner

*Primary Examiner* — Timothy A Musselman
(74) *Attorney, Agent, or Firm* — Davis Wright Tremaine LLP (57) ABSTRACT

A mobile aircraft simulation tool that includes a simulated aircraft body extending between a front end and rear end along a central axis X and having a length of between 10 and 60 feet. The simulated aircraft body includes a plurality of windows, one or more doors, an internal cavity, and a passenger cabin within the internal cavity having a plurality of seats.

19 Claims, 11 Drawing Sheets

MOBILE AIRCRAFT SIMULATION SYSTEM AND METHOD

CROSS-REFERENCE TO RELATED APPLICATION

This application is a non-provisional of and claims the benefit of U.S. Provisional Application No. 62/962,796, filed Jan. 17, 2020, entitled "MOBILE AIRCRAFT SIMULATION TOOL,". This application is hereby incorporated herein by reference in its entirety and for all purposes.

BRIEF DESCRIPTION OF THE DRAWINGS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

At this time, there are only non-mobile training fuselages for airlines, first responders, military and various special needs groups. The only other options available are actual fuselages that are revenue generating and can be costly to take out of service or cumbersome to attempt to move into specific locations for training purposes. In accordance with various embodiments, a Mobile Aircraft Simulation Tool (MAST) can be a self-contained training simulator that allows for easy mobility and provides a realistic aircraft environment for those exposed to it.

As discussed in more detail herein, the MAST can be configured for simulating and/or training for various normal or emergency aircraft situations such as putting out fires in various locations of an aircraft; evacuation of an aircraft; emergency entry into an aircraft; tactical or law enforcement operations involving an aircraft; treating and removing medical patients from an aircraft; water and land crashes; in-air turbulence situations; opening and repairing doors or other parts; training pilots and flight attendants, and the like. Accordingly, in various embodiments, the MAST can be configured for simulating power loss, fires, smoke, flooding, electrical malfunctions, damaged or jammed parts (e.g., doors or seats); landing, takeoff, turbulence, crashing in water or on land, and the like. In some embodiments, a MAST can be specialized for simulating a specific scenario or class of scenarios.

Example embodiments of MASTs of various sizes are shown and described herein, but these examples should not be construed to be limiting on the wide variety of different sizes and configurations of MASTs of further embodiments. Accordingly, various examples can be configured simulating various suitable portions of an aircraft with the MAST being of any suitable size.

Various examples include a MAST having a motorized or non-motorized chassis that can be transported to any location desired. For example, a MAST can be disposed on a trailer that can be towed from location to location, can be part of a motorized vehicle such as a bus, or the like. Accordingly, in various examples, the MAST can be sized, or configured to be sized, for legal driving or transport on public roads in accordance with a given jurisdiction such as the United States, Europe, and the like (e.g., compliance with 2020 US Department of Transportation (DOT) requirements for road transportation that would allow one to operate the MAST legally on public roads at effectively any time and without restriction and/or without requiring special oversized-load permits).

A MAST can be configured for various types of simulations, with the interior and exterior of the MAST being configured accordingly. For example, some embodiments can include a mock interior which can immerse a user into an aircraft environment including upholstered seats, functioning overhead compartments, functioning lights, and the like. In contrast, a MAST configured for fire simulation can have limited elements or have elements that will not burn or not produce toxic products if burned. Similarly, a MAST can be configured for exposure to water via flooding or fire suppression training.

Figure 1:
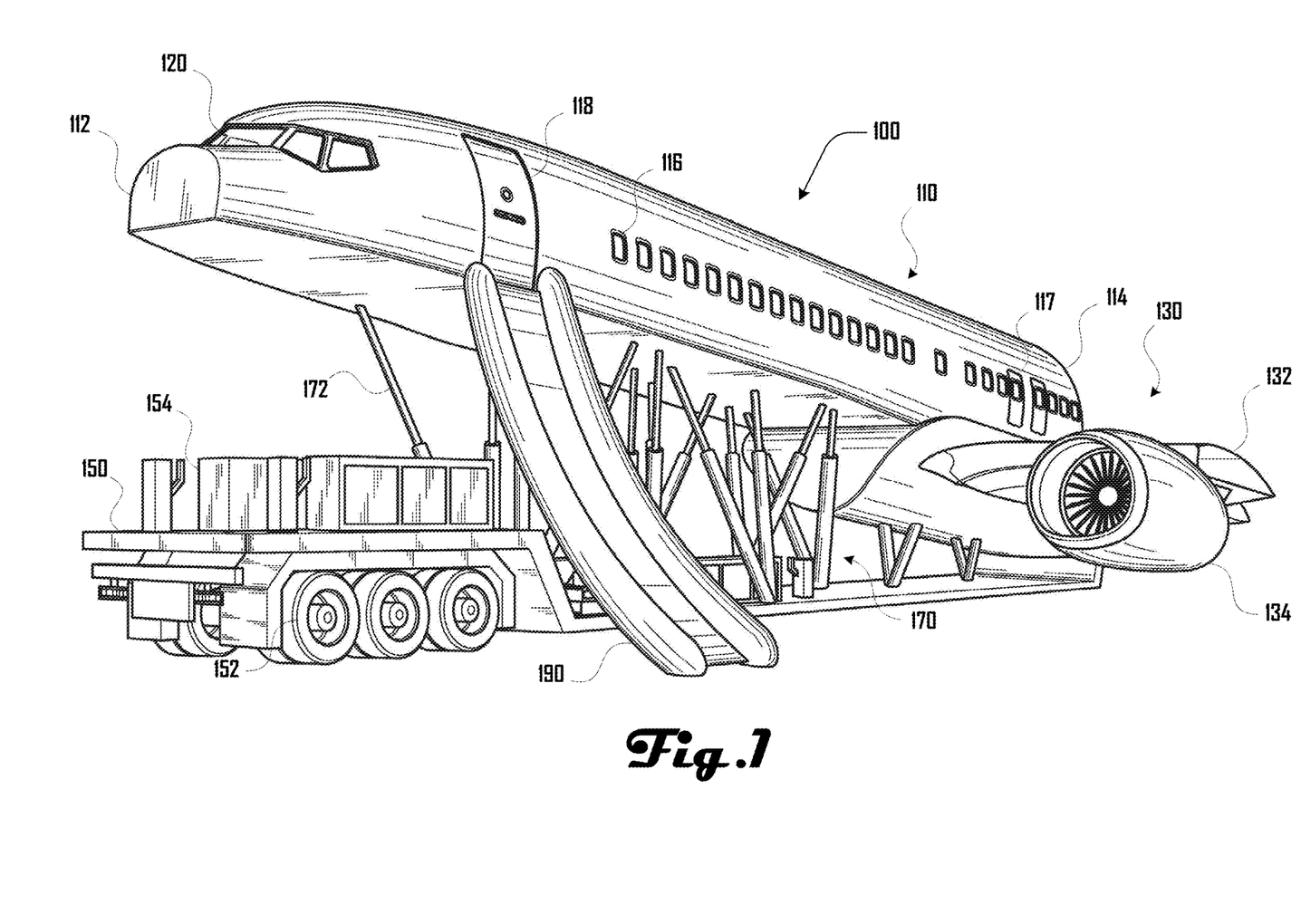
FIG. 1 is an exemplary perspective drawing illustrating an embodiment of a Mobile Aircraft Simulation Tool (MAST) that includes a simulated aircraft body and a wing portion that are disposed on a mobile trailer.
Figure 2:
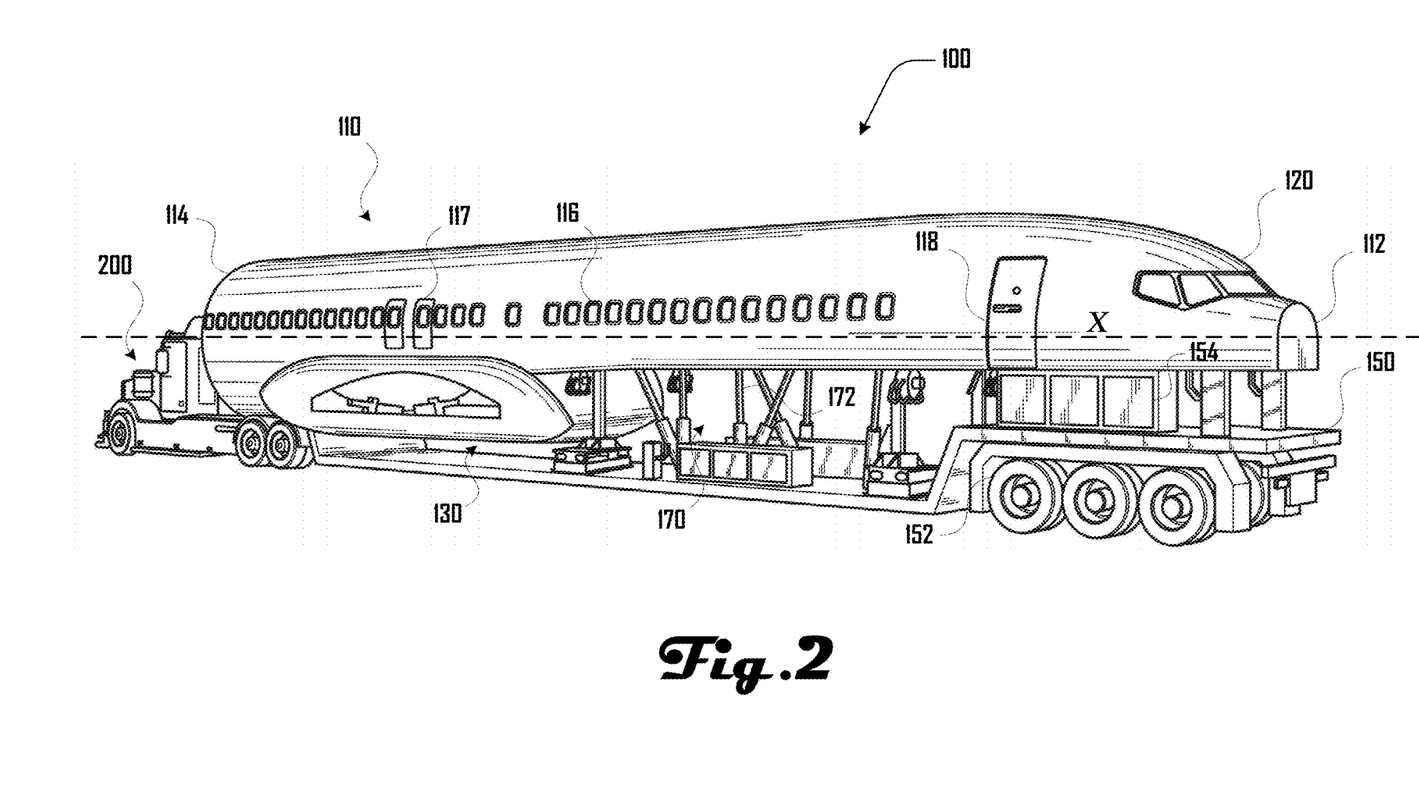
FIG. 2 is an exemplary perspective drawing illustrating the MAST and trailer of FIG. 1 being pulled by a big rig truck at the rear end of the aircraft body.

Turning to FIGS. 1 and 2, an example embodiment of a MAST 100 is illustrated that includes a simulated aircraft body 110 that extends between a front and rear end 112, 114 along a central axis X. The body 110 comprises a plurality of windows 116, one or more emergency exits 117, one or more doors 118 and a cockpit portion 120 at the front end 112. Further aspects in the internal and external portion of the simulated aircraft body 110 are discussed in more detail herein.

The MAST 100 further includes a wing portion 130 that can comprise a wing 132 and an engine 132. In various embodiments, the MAST 100 can include a pair of opposing wings 132 and engines 132 as in conventional aircraft; however, in some embodiments such as the example of FIGS. 1 and 2, the MAST 100 can include only a single wing portion 130 with only a single wing 132. Such an embodiment can be desirable to provide for a lighter and simpler MAST 100 where a pair of opposing wings 132 is not necessary for a desired simulation.

Additionally, in various embodiments, the wing portion 130 can be modular, collapsible, foldable, telescoping, extendible, or the like. For example, FIG. 2 illustrates the wing portion 130 of the MAST 100 in a configuration where the wing portion is in a transport configuration such that the wing portion 130 does not substantially extend outward from the body 110 such that the MAST is portable and road legal. In some examples, the wing portion 130 or one or more sections thereof can be removable such that the wing portion 130 can be disassembled for transport and assembled at a simulation location.

Figure 4:
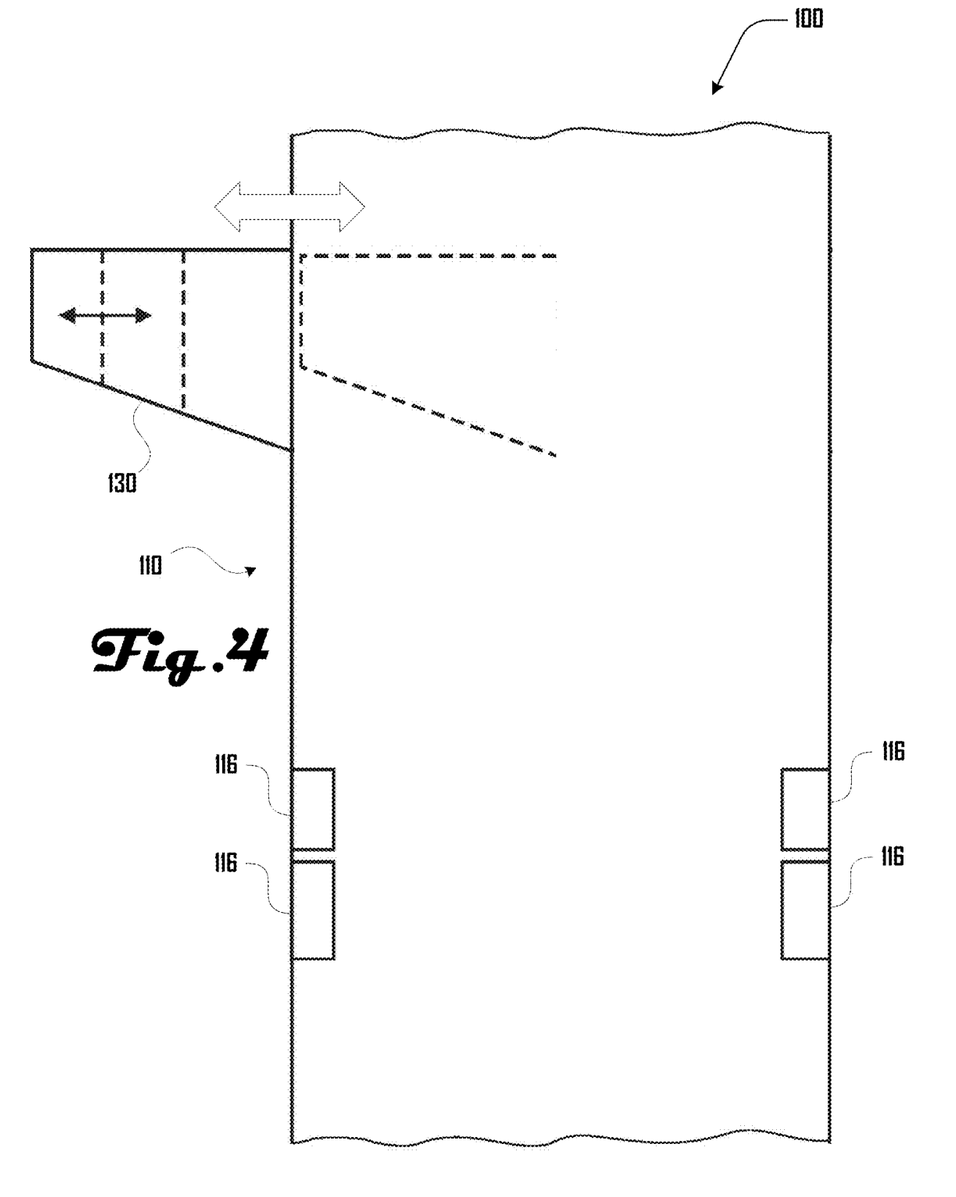
FIG. 4 illustrates an example of a wing portion configured to extend from below the aircraft body.

In some examples, the wing portion 130 or sections thereof can be movable such that the wing portion 130 or sections thereof can be disposed under the body 110 in a transport configuration and then extended outward at a simulation location. For example, FIG. 4 illustrates an example of at least a wing portion 130 extending from below the body 110. In some examples, the wing portion 130 or sections thereof can be mounted on rails to provide for extension and retraction via motor, pneumatic cylinder, crank, manual movement, or the like. Similarly, in some embodiments the wing portion 130 or sections thereof can be telescoping and/or nested.

In some embodiments, the wing 132 and/or engine 134 can be removably coupled to the MAST 100, so that such pieces can be disassembled into one or more pieces for transport and then coupled to the MAST 100 at a simulation location. In some embodiments, the wing 132 or other portions can be foldable. For example, the wing 132 may be foldable upward for transport with a further distal portion foldable over the top of the body 110.

Additionally, it should be clear that further embodiments can suitably combine such configuration methods. For example, one embodiment can include a wing 132 that is extendable from the MAST 100 and an engine 134 can be coupled to the extended wing 132. In another example, a proximal portion of a wing 132 can extend from the MAST 100, and a separate distal portion of a wing 132 can be coupled to an end of the proximal portion of the wing 132.

The wing portion 130, wing 132 and engine can be configured in various suitable ways. In some embodiments, some or all of the wing 132 can be load-bearing and include functioning elements such as flaps, lights, and the like. For example, where it is desirable to simulate passengers escaping though an emergency exit over a wing; sliding off a wing; entry into the aircraft including walking on the wing; or the like, some or all of the wing 132 can be sufficiently load-bearing to allow for such a simulation. In some embodiments, only a proximal section of the wing 132 can be load-bearing (e.g., the first 8, 10, 12, 14 or 16 feet or any suitable range therein). A distal portion of the wing 132 (compared to an operable aircraft) can be absent or a portion thereof can be represented with a non-load-bearing section. Additionally, the configuration of the wing 132 can be configured for compliance with a certification standard including Aircraft Rescue and Fire Fighting (ARFF) standards of the Federal Aviation Administration (FAA), or the like. For example, total wing length can be at least 20, 25, 30, 35, 40 feet or the like from the center of the body 110 of MAST 100. In some embodiments, a wing 132 can be absent.

The one or more engine 134 can be configured in various suitable ways, including an operable jet engine; a simulated engine configured to generate or simulate wash and/or noise from an engine; a simulated engine with rotating fan blades; a simple simulated engine housing; and the like. Additionally, the engine can be configured for various simulations including fire, loud sound to emulate engine noise, engine damage, electrical issues, fuel leak, oil leak, or the like. For example, a fire-simulation engine can be configured to release a combustible fluid (e.g., propane), have replicable portions that can be burned, or the like. In some embodiments, there can be any suitable plurality of engines 134 or an engine can be absent.

As shown the example of FIGS. 1 and 2, in some embodiments, the body 110 and/or wing portion 130 can be permanently or removably disposed on a trailer 150 having wheels 152, which can allow the MAST 100 to be mobile. Additionally, the trailer 150 can comprise various MAST systems 154, such as a fluid source, fluidic actuation system, power supply, air conditioning system, air pump, water pump, power supply, fuel supply (e.g., for fire simulation), smoke machine, control system, and the like.

For example, in some embodiments, it can be desirable for the MAST 100 to have an independent power source (e.g., a generator) that allows the MAST 100 to operate without access to an external power source. However, in various embodiments, the MAST can be configured to be plugged into or otherwise obtain power from one or more external power sources.

Additionally, as shown in FIGS. 1 and 2, the MAST 100 can comprise an actuation system 170 that can be configured to move the body 110 and/or wing portion 130. For example, in some embodiments the actuation system 170 can comprise one or more fluidic cylinders 172 extending between the trailer 150 and body 110 and/or wing portion 130 that are configured to expand and contract to move the body 110 and/or wing portion 130. For example, in some embodiments, the actuation system 170 can be configured to raise and lower the front end 112 of the body 110; raise and lower the rear end 114 of the body 110; raise and lower the body 110 generally; cause tilt, rotation and/or roll of the body 110 about the central axis X or other suitable axis; and the like.

Such movement of the MAST 100 can provide for simulation of static positions of an aircraft or movement of an aircraft. For example, the MAST 100 can assume a static position tilted to one side with the rear end 114 angled upward to simulate a crash on uneven ground to train for evacuation in such non-level conditions. In another example, movement can simulate in-air turbulence for training a flight crew to handle such an event. In various embodiments, the actuation system 170 can be configured to simulate various active and/or static conditions such as, takeoff, landing, turbulence, passing through and air-pocket, bird strike, in-air collision, crash landing in water or on land, and the like.

As discussed herein, in various embodiments the MAST 100 can be portable. For example, FIG. 2 illustrates a big rig truck 200 pulling the trailer 150 at the rear end 114 of the body 110. In further embodiments, the MAST 100 can be configured to be towed by various suitable vehicles or the MAST 100 itself can be motorized and movable. For example, FIGS. 6-9 illustrate further examples of the MAST 100 being movable via a trailer and/or as a vehicle.

In various embodiments, the MAST 100 can be movable and can be dropped off at a desired location. For example, in some embodiments, the MAST 100 can be towed via a trailer 150 to a destination, and the MAST 100 can be separated from at least a portion of the trailer 150 such that the trailer 150 can then be moved to another location from where the MAST 100 has been dropped off. Location for parking or drop off of the MAST 100 can include locations such as an airport, parking lot, field, or the like, and in some examples, the MAST can be configured to be parked or dropped off in a pool, pond, lake or other body of water for water-related simulations.

Figure 3A:
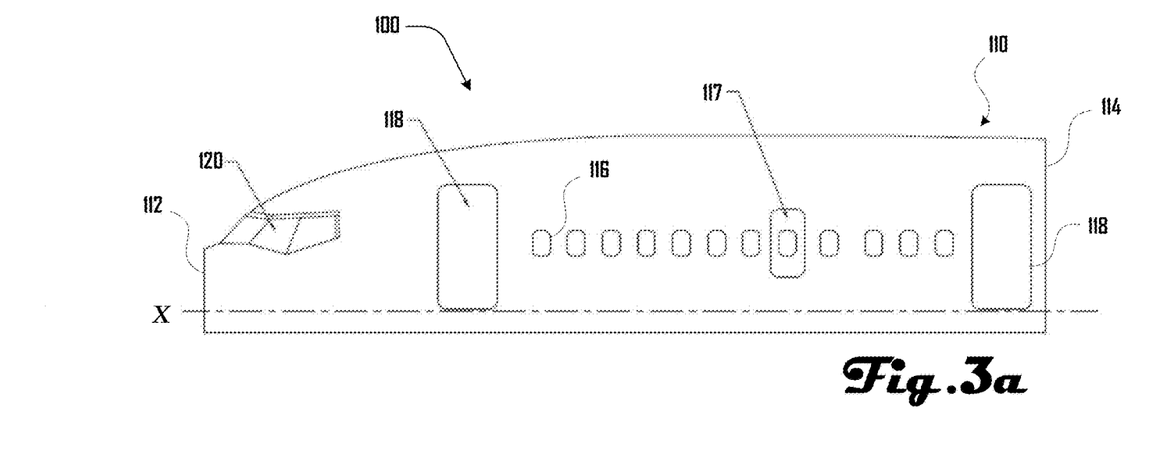
FIG. 3a illustrates a side view of one embodiment of a MAST.
Figure 3B:
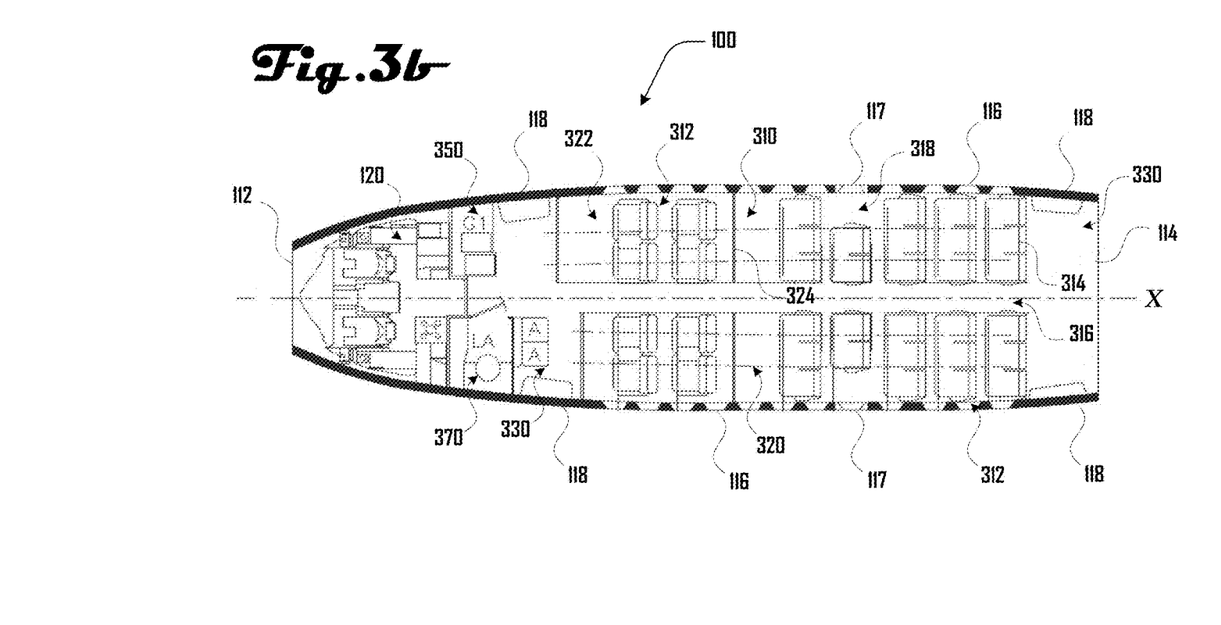
FIG. 3b illustrates a cut-away top view of the MAST of FIG. 3a including an internal cavity of the body comprising a passenger cabin having a plurality of rows of seats separated by an aisle.

A MAST 100 can be configured to simulate various suitable portions of an aircraft ranging from a complete aircraft to only certain sections or components of an aircraft such as one or more of a door, lavatory, cockpit, galley, cabin, entryway, storage location, overhead compartments, or the like. For example, FIGS. 3a and 3b illustrate one example embodiment of a MAST 100 including a side view and a cut-away top view. In this example, the body 100 comprises a plurality of windows 116, emergency exits 117, doors 118 and a cockpit portion 120 at the front end 112. The front and rear end 112, 114 are truncated in this example. Specifically, instead of having a nose of a typical aircraft, the front end 112 can be flat and the rear end 114 can be flat as well and not include typical rear portions of an aircraft such as the tail and the like.

As shown in FIG. 3b, an internal cavity of the body 110 can comprise a passenger cabin 310 having a plurality of rows 312 of seats 314 separated by an aisle 316 including exit rows 318 positioned by emergency exits 117. The passenger cabin 310 can comprise a coach section 320 and a first class section 322, which are divided by a bulkhead 324. The passenger cabin 310 can further comprise entryways 330 proximate to the doors 118 along with a galley 350, lavatory 370 and cockpit 120.

Figure 6:
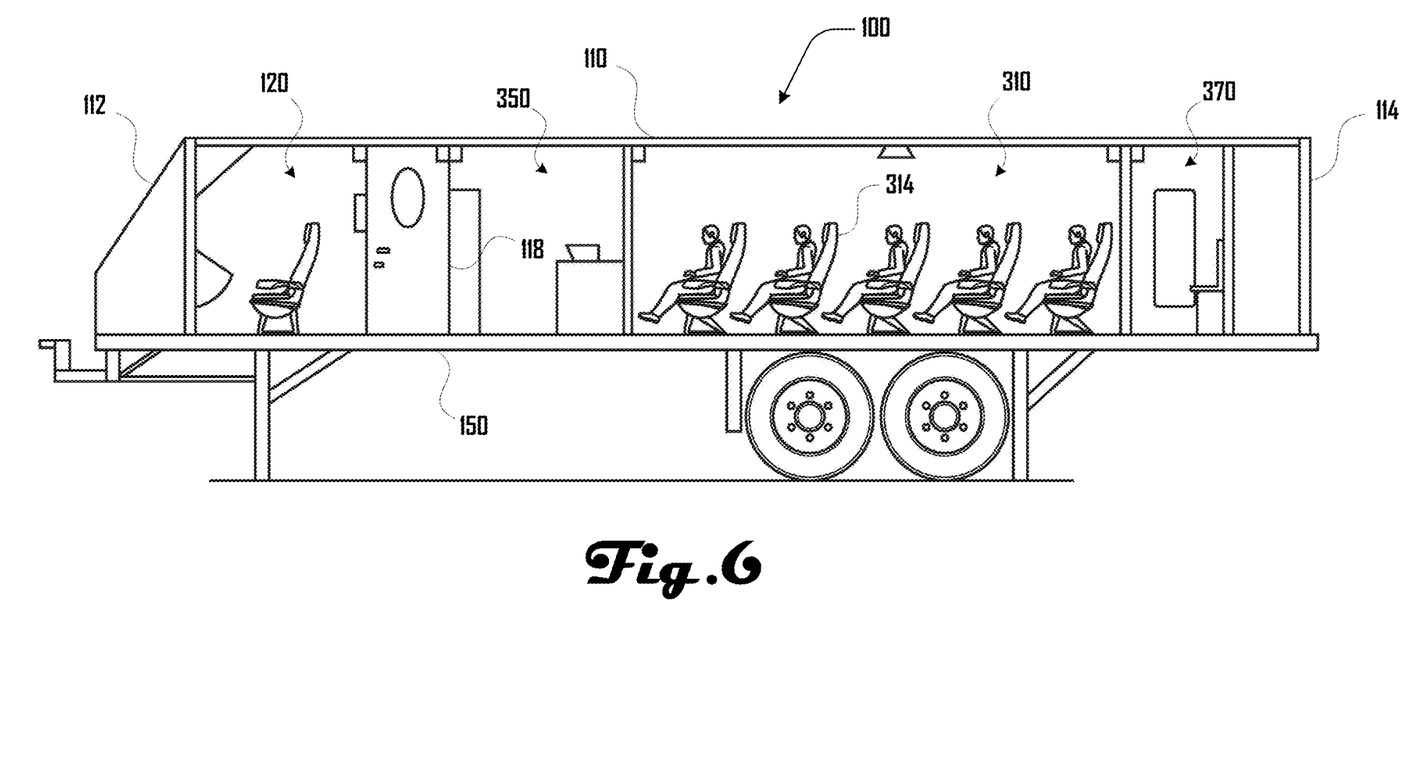
FIG. 6 illustrates an example of a MAST disposed on a trailer that includes an aircraft body having a cockpit, door, galley, passenger cabin with seats and a lavatory.
Figure 7:
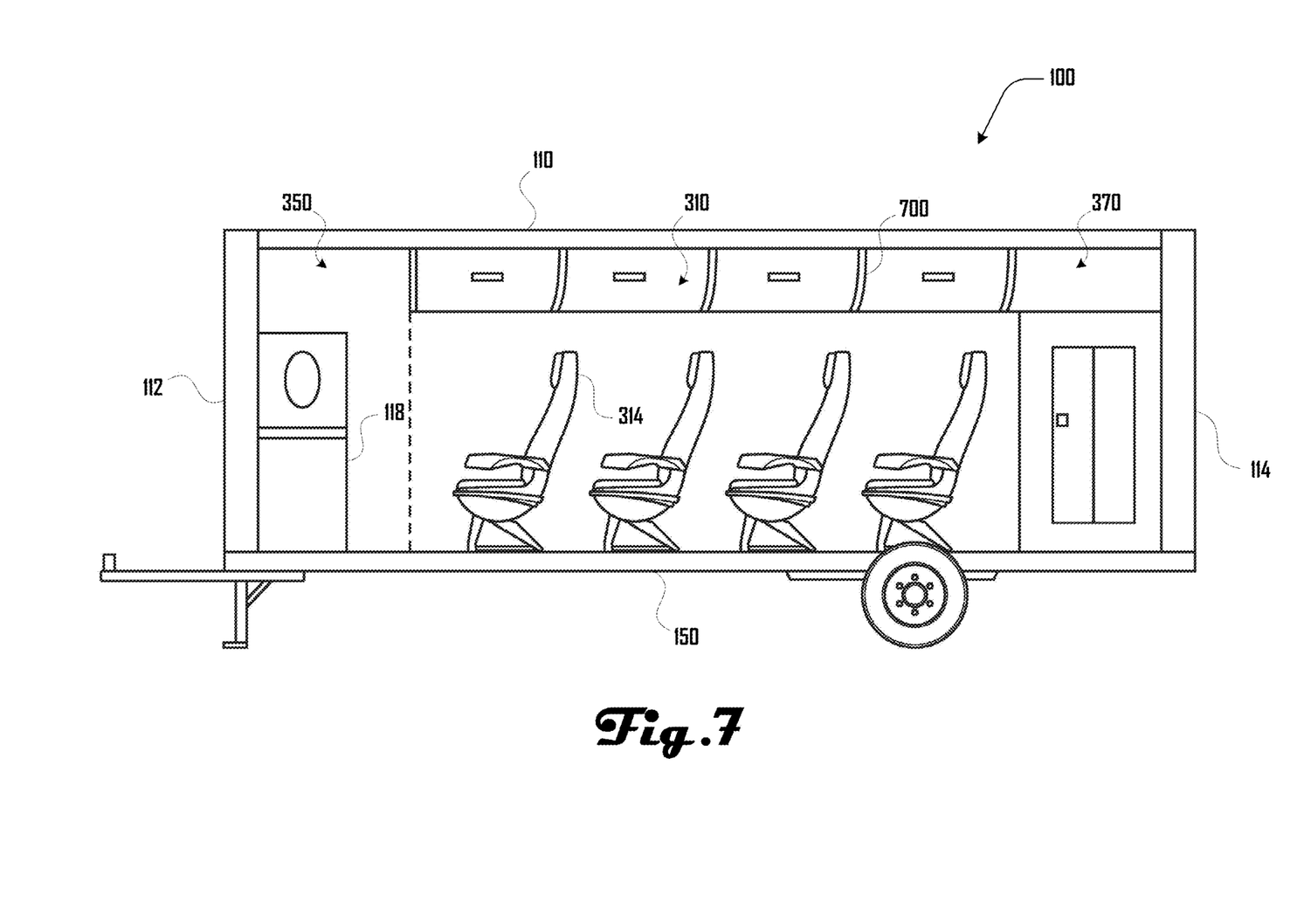
FIG. 7 illustrates an example of a MAST disposed on a trailer that includes a body having a door, galley, lavatory, and passenger cabin with seats, windows, and overhead bins.
Figure 8:
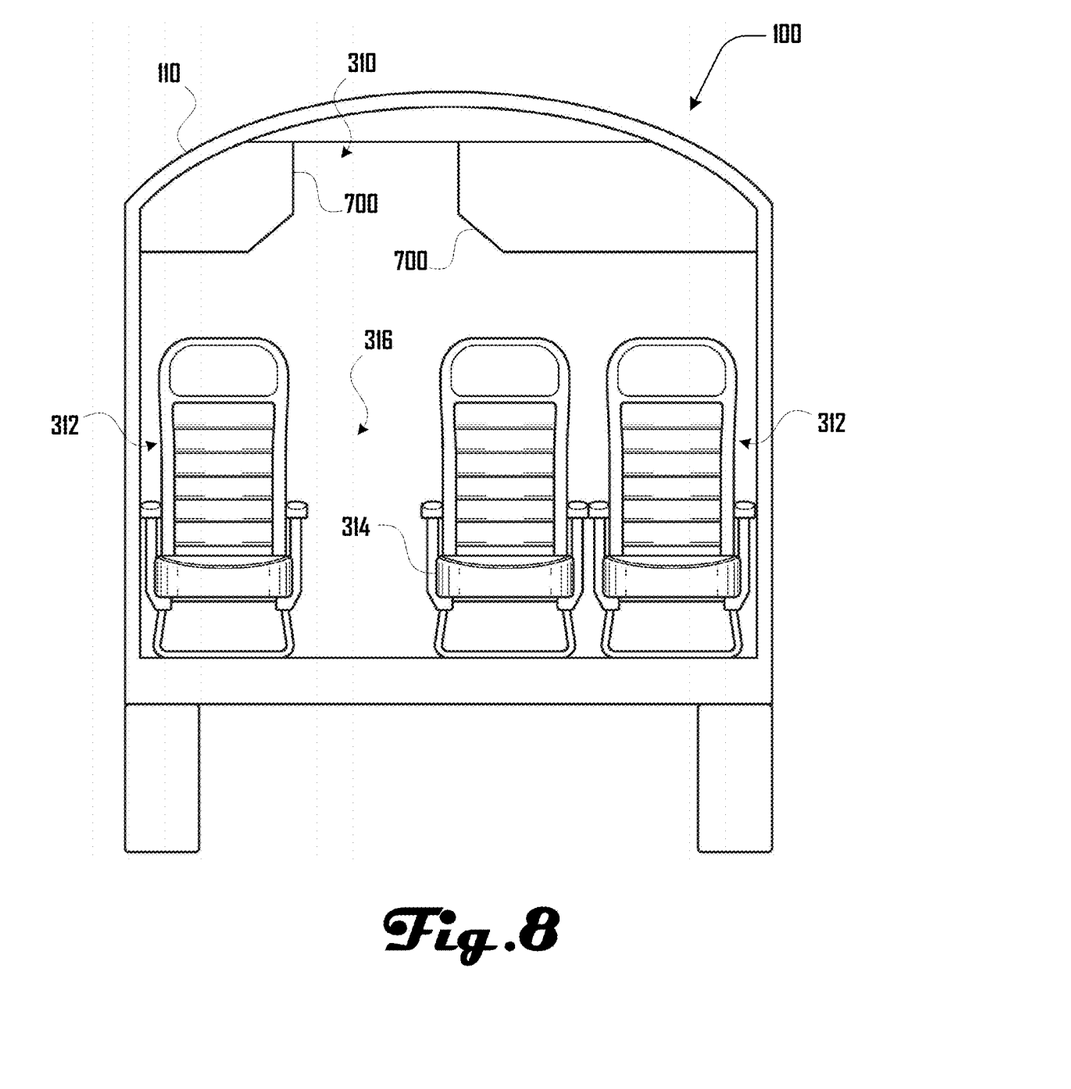
FIG. 8 illustrates an example of a MAST embodied in a bus that includes a body having a passenger cabin with overhead bins and rows of seats on opposing sides of an aisle.

For example, FIG. 6 illustrates an example of a MAST 100 disposed on a trailer 150 that includes a body 110 having a cockpit 120, door 118, galley 350, passenger cabin 310 with seats 314, and a lavatory 370. In another example, FIG. 7 illustrates an example of a MAST 100 disposed on a trailer 150 that includes a body 110 having a door 118, galley 350, lavatory 370, and passenger cabin 310 with seats 314, windows 116, and overhead bins 700. In yet another example, FIG. 8 illustrates an example of a MAST 100 embodied in a bus that includes a body 110 having a passenger cabin 310 with overhead bins 700 and rows 312 of seats 314 on opposing sides of an aisle 316. Various other suitable embodiments of a MAST 100 of various sizes and configurations are within the scope and spirit of the present disclosure, and these few examples should not be construed to be limiting. For example, one embodiment can comprise a double-wide trailer that is transportable in two separate halves that are combinable at a simulation location.

It should be clear that these examples are for illustrative purposes only and is not limiting on the wide variety of configurations of the internal portion of the body 110 that are within the scope and spirit of further embodiments. Indeed, any of the elements described herein can be present in any suitable plurality, present in singular or be absent in some embodiments, or can be in different suitable orientations. For example, while various examples show a simulated passenger cabin 310 with seats 314, rows 312 and aisles 316 facing the front and rear 112, 114 of the MAST 100, further embodiments such as the example of FIG. 10, can include seats 314, rows 312 and aisles 316 facing sides of the MAST 100.

Figure 9:
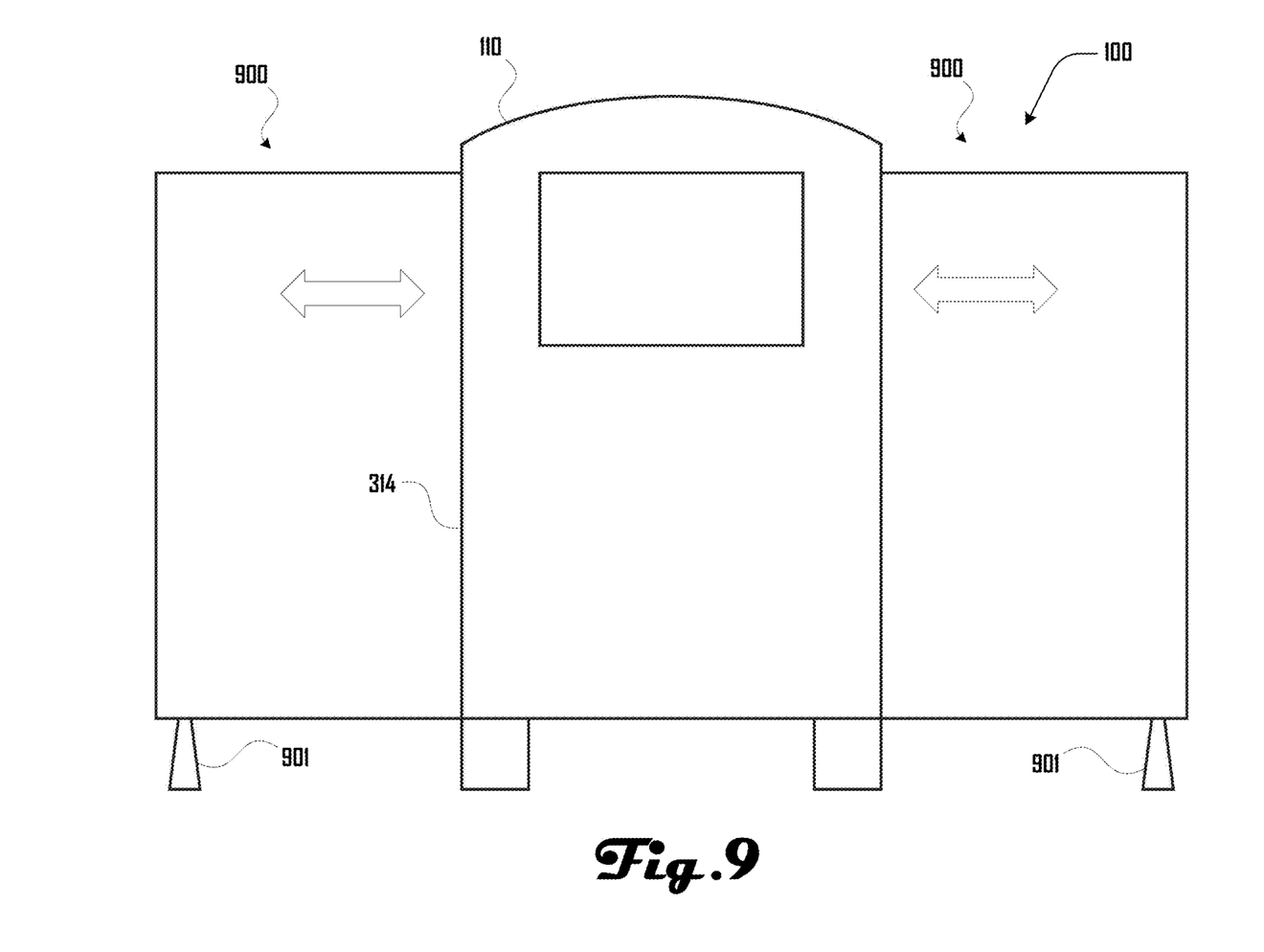
FIG. 9 illustrates a rear view of a MAST having a first and second expansion compartment that are configured to expand and retract within the body to expand or contract space within the body.
Figure 10:
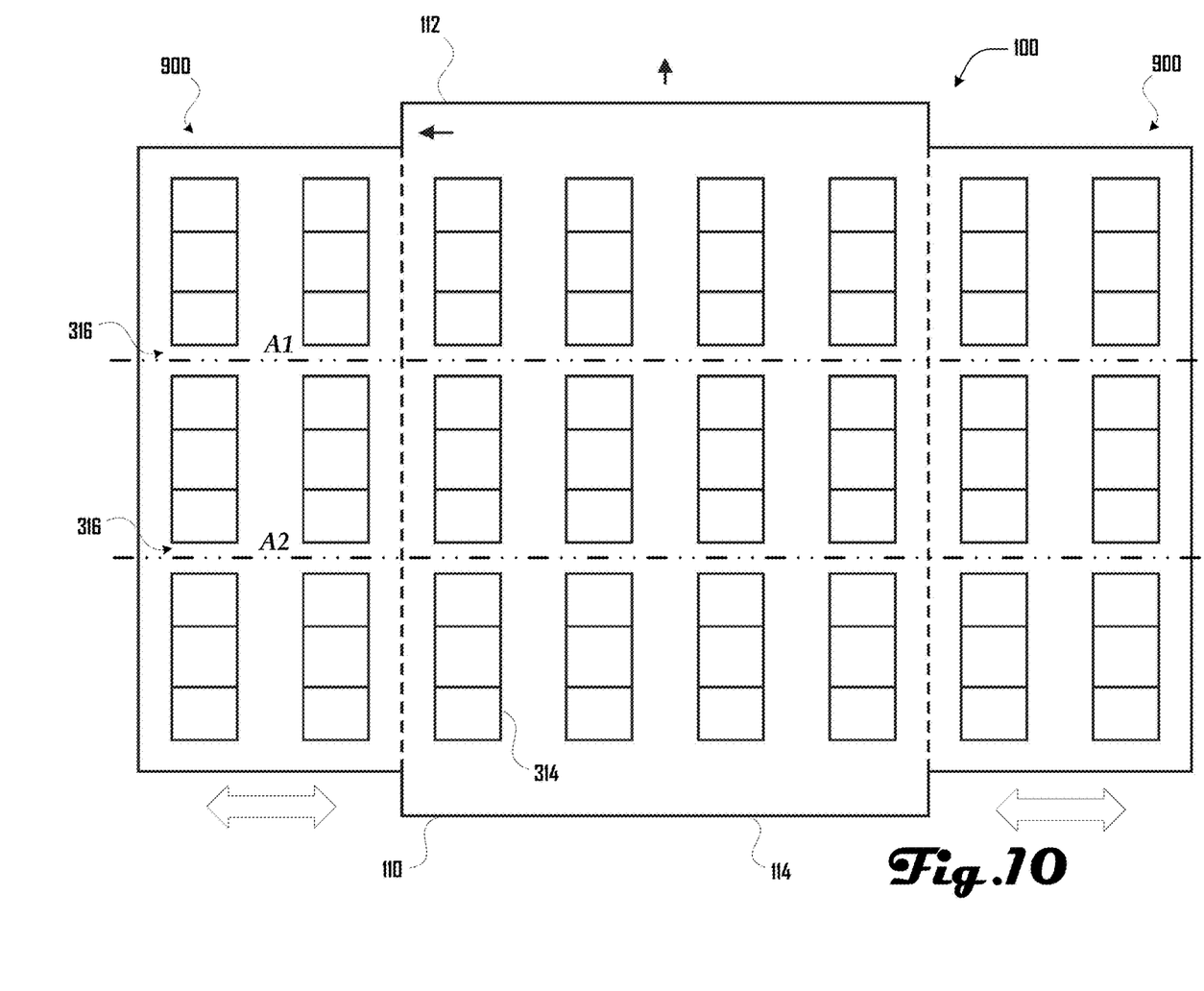
FIG. 10 illustrates an example of a top view of a MAST having a first and second expansion compartment that are configured to expand and retract within the body to expand or contract space within the body having rows of seats.

Additionally, in some embodiments, the MAST 100 can be expandable and collapsible, which can allow for a collapsed configuration suitable for transport on roads (e.g., that complies with local or federal laws related to size, etc.). In other words, the MAST 100 can be configured for legal transport on roads and then expandable to a size that would not be legal for transport on roads. For example, FIGS. 9 and 10 illustrate example embodiments of a MAST 100 having a first and second expansion compartment 900 that are configured to expand and retract within the body 110 to expand or contract space within the body 110. As shown in the example, such expansion compartments can be supported by outrigger supports 901. In further examples, the MAST 100 can include only one expansion compartment 900, any suitable plurality of expansion compartments 900, or may lack expansion compartments 900.

Figure 11:
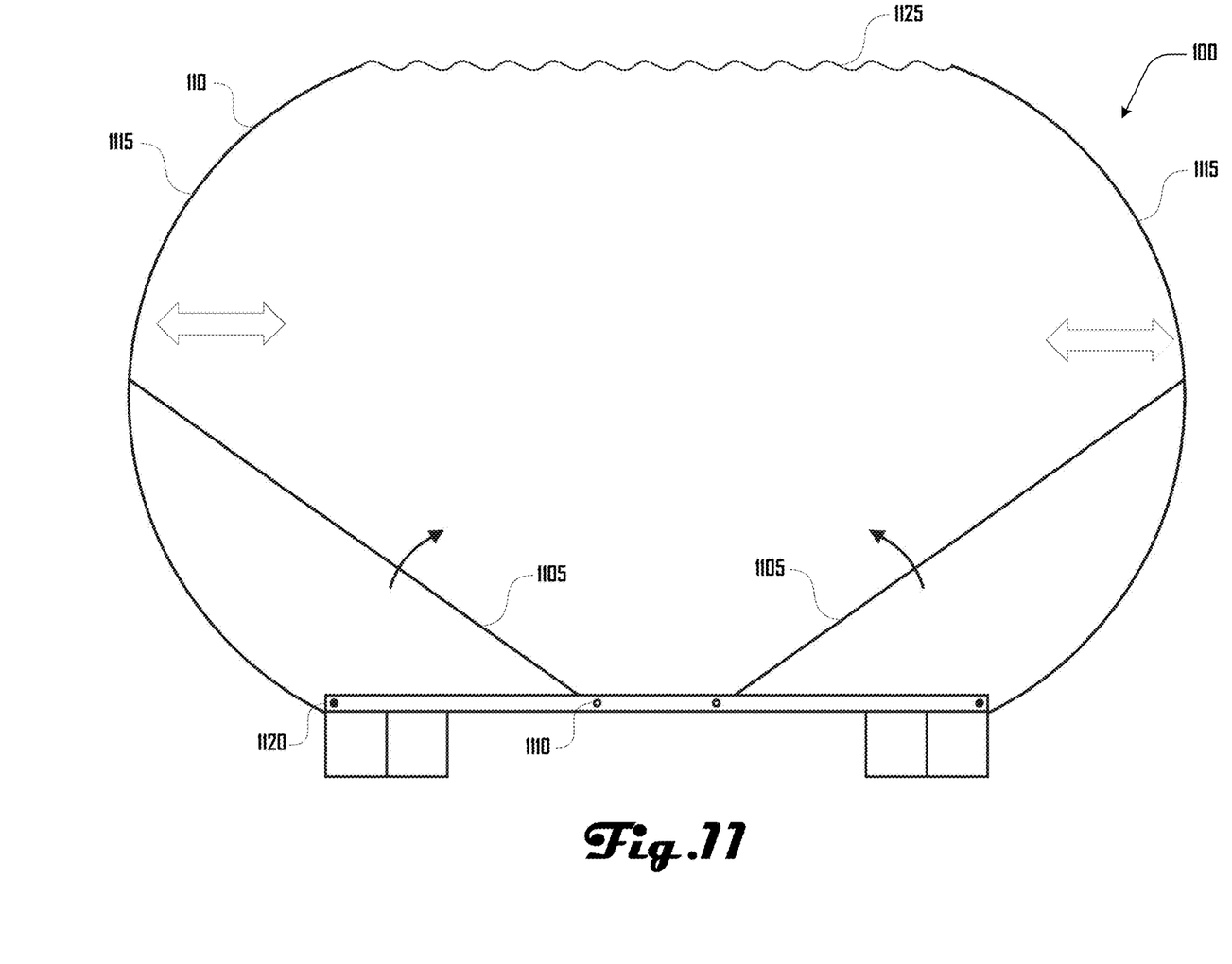
FIG. 11 illustrates an example embodiment of a MAST having floor sections that are configured to rotate upward via floor pivots within the body to reduce space for transport.

In addition to linear expansion as shown in the example of FIG. 9, some embodiments can expand via rotation of various elements. For example, FIG. 11 illustrates an example embodiment having floor sections 1105 that are configured to rotate upward via floor pivots 1110 within the body 110 to reduce space for transport. Sidewalls 1115 of the body 110 can be configured to rotate about body pivots 1120 to reduce or expand the volume of the body 110 allow the floor sections 1105 to assume a flat and pivoted-up configuration respectively. In some embodiments, an extensible top portion 1125 can allow for expansion and contraction of the sidewalls via rotation, linear movement, or the like.

Additionally, the MAST 100 or portions thereof can be configured to emulate specific brands of aircraft (e.g., Boeing, Airbus, Douglass, Lockheed, Bombardier, and the like); to emulate specific models of aircraft (e.g., A220, A320, A330, A350, A370, 737, 747, 767, 777, 787, and the like); to emulate configurations and looks of specific airlines (e.g., Delta, American, Lufthansa, United, Air-France, Emirates, IAG, Southwest, Alaska, China Southern, China Eastern, Nippon, and the like). In some embodiments, portions of the body 110 can be modular and reconfigurable to selectively emulate different brands, models and/or airlines. In some embodiments, the interior of the body 110 can have a hybrid configuration that emulates more than one brand, model and/or airline. For example, rows 312 of chairs 314 and overhead bins on the left side of the aisle 316 in the cabin 310 can be Boeing and the rows 312 of chairs 314 and overhead bins on the right side of the aisle 316 in the cabin 310 can be Airbus.

Additionally, while various examples herein relate to a MAST 100 that corresponds to a commercial airliner, further embodiments can correspond to various suitable types of aircraft, including cargo planes, military aircraft, and the like. Additionally, further embodiments can relate to any suitable type of vehicle, building portion, or the like, so the examples herein should not be construed to be limiting.

A MAST 100 can have various elements that function equivalent to such elements on an aircraft; that function in a way that emulates equivalency to such elements on an aircraft from a user perspective; that function in way similar to such elements on an aircraft from a user perspective; that do not function but look equivalent to or similar to such elements on an aircraft; that are non-functioning pictorial representations of such elements on an aircraft, and the like. In some embodiments, such elements can be modular, removable or configurable so that the functionality of such can be changed.

For example, in some embodiments, the MAST 100 can comprise one or more fully operable lavatories 370 (e.g., with working toilet configured to receive human waste; a sink with running hot and/or cold water that flows into a drain; and the like); however, while such a lavatory 370 may operate similar to or equivalent to a lavatory of a real airliner from a user perspective, the lavatory 370 of the MAST 100 can be configured differently. Having one or more working lavatories 370 on the MAST 100 can be desirable for providing realism to simulations and can be used by people participating in or conducting simulations with the MAST 100, which can allow the MAST to operate in locations where there are not sufficient bathroom facilities or where bathroom facilities are not present.

In another example, portions of the cockpit 120 of the MAST 100 can be configured to emulate at least a portion of a cockpit user interface including displays, haptic output, audio output, and the like. In various embodiments, displays such as screens, dials, lights and the like can be configured to emulate or be similar to such elements on a real aircraft, including presenting simulated output, which in some examples can correspond to a state of the MAST 100. In one example, such displays or output can present output that simulates takeoff, landing, emergencies, alleviation of emergencies, a crash, engine failure, or the like. In another example, output of such displays or the like can correspond to pitch, roll and/or yaw generated by the actuation system 170 and/or actions of users in other locations of the MAST 100 (e.g., putting out a simulated fire, opening an emergency door 117, or the like).

Similarly, in various embodiments, a cockpit interface can allow for user input, which can affect output by the cockpit interface, movement generated by the actuation system 170, the state of elements in other locations of the MAST 100, and the like. For example, in some embodiments, a user can operate a stick, yoke, petals, throttle, or the like, which can cause the actuation system 170 to move the MAST 100 in response (or with limited response due to a simulated emergency or failure). In another example, a user can operate a simulated fuel shutoff, which can end a simulated fire in another location on the MAST 100.

In some examples, only a portion of a cockpit interface can be provide with full or limited emulated functionality, with other portions simply being images or crude representations of an interface. Additionally, portions of a cockpit interface can be modular, removable or interchangeable or movable to allow different elements to be installed or configured for different simulations, to emulate different makes, models and airlines, and the like. For example, some embodiments can include an interchangeable yolk and stick that allows for simulation of either type of control system as desired.

Such configurations conform with simulation or certification requirements defined by ARFF or the like. While a cockpit interface is used as one example illustration, it should be clear that other portions of the MAST 100 can provide for similar input, output, display, and like. For example, a galley 350, lavatory 370 or other location or element can be similarly configured.

In various embodiments, the MAST 100 can be configured to simulate smoke, fire, electrical issues, flooding, fluid release, and the like, in various locations. For example, in some embodiments, one or more smoke machine can generate smoke in one or more specified location in the MAST 100 including one or more of the cockpit 120, a galley 350, lavatory 370, a specific overhead bin 700, a window 116, a door 118, a specific seat 314, a specific row of seats 312, and the like. In various embodiments, an operator can select smoke for such specific locations to generate specific desired simulations related to fire or smoke. Similar specified locations of simulations can also be applied to simulations of fog, gas leak, fire, sparks, power loss, flooding, lighting, fluid release, and the like. Additionally, various locations can be configured for various lighting states, including dimmed cabin for landing; bright cabin for normal operation; dark cabin; dark cabin with emergency lights illuminated; and the like.

In various embodiments, the MAST 100 can comprise modular, replaceable and/or removable elements that are intended to be damaged during one or more simulation and then replaced with a fresh element for further simulations. Such elements can be configured to be pierced, burned, flooded, broken, bent, or the like and then replaced.

For example an airport crash tender or airport fire appliance is a specialized fire engine designed for use in aircraft rescue and firefighting airports and military air bases. Various tenders have an elevated extended extinguishing arm configured to raise a water/foam cannon to a height of approximately 10 to 20 meters, with a reinforced water/foam nozzle (also called a snozzle) that can puncture through superficial structures of an airplane and direct water, foam, or the like directly inside the fuselage of the aircraft. Additionally, the tender can include imaging systems such as thermal or video cameras that allow an operator to identify locations where fire and passengers are present within an aircraft and then select to pierce the aircraft in a location to avoid hitting passengers, while also effectively fighting a fire.

Figure 5:
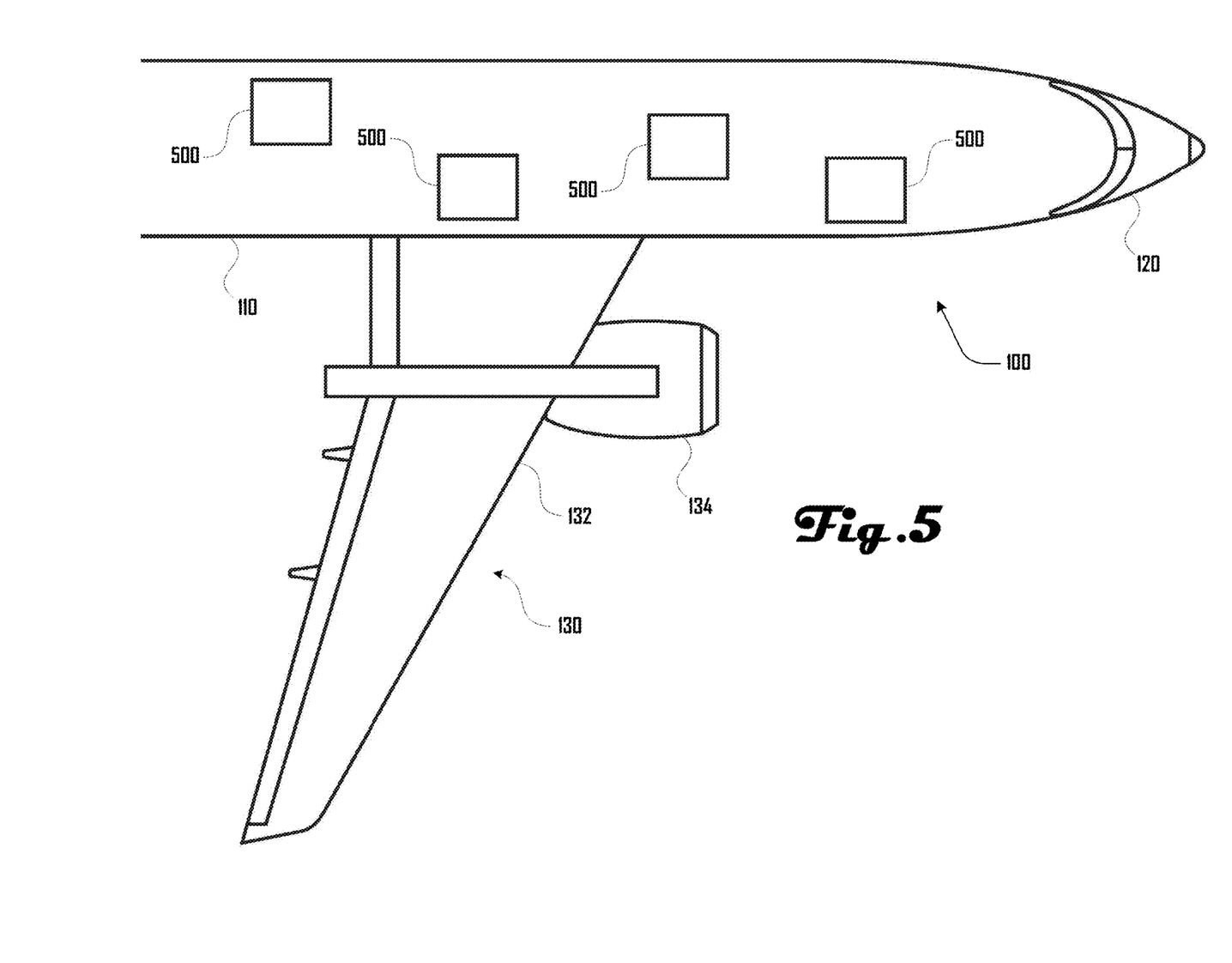
FIG. 5 illustrates an example of a MAST comprising a plurality of replaceable piercing panels located in various locations of the aircraft body.

Simulating the piercing and introduction of fire suppressant within an aircraft is important training for fire crews, but can be difficult to simulate since a full simulation requires piercing of an aircraft. Accordingly, in various embodiments, the MAST 100 can comprise one or more replaceable piercing panels that allow for simulation of putting out fires with a piercing nozzle. For example, FIG. 5 illustrates an example of a MAST 100 comprising a plurality of replaceable piercing panels 500 located in various locations of the body 110. In some embodiments, piercing of an aircraft to fight a fire can be optimal above the windows of the aircraft because such an area can be thinner and have fewer critical systems compared to other locations.

Accordingly, the example of FIG. 5 illustrates the plurality of piercing panels 500 located on the top of the body 110 along the length of the body 110. Such piercing panels 500 can be of various suitable sizes and in any suitable location in further embodiments, and some examples only have a single piercing panel 500. In various embodiments, piercing panels 500 can be configured to have a construction that would sufficiently simulate piercing the fuselage of a real aircraft and can be configured to be pierced multiple times before being replaced.

Additionally, further fire emergency simulation elements can be disposed within the body 110 proximate to piercing panels 500. For example, fire can be generated proximate to one or more piercing panels 500 such as via a fuel like propane or burning elements such as wood or the like. Some embodiments can also include thermal simulation in addition to or alternative to real fire, which can be desirable for training with thermal imaging systems. For example, some embodiments can include dummies, or the like, that are configured to radiate heat to simulate a human body, which can be desirable for training fire crews to avoid piercing at a location where passengers may be, or to simulate heat signatures of people for simulation of rescue or tactical scenarios.

Additionally, where fire suppression training involves water, foam or other fire suppressant, the MAST can be configured to drain or remove such material to prevent flooding and allow multiple simulations to be run with minimal reset time. For example, in various embodiments, the MAST can comprise a drain system that allows liquids to drain from the inside of the body 110 and, in some examples, such a drain may lead to a large storage tank for waste where drainage into the local environment is not allowed or is impractical. Some examples can comprise a sprinkler or venting system to remove foam that may be used in simulations.

Various other suitable elements of the MAST 100 can be replaceable with the intention of damaging the element during one or more simulations and then replacing the element. For example, elements such as doors 118, windows 116, and the like can be configured to be damaged and replaced for simulation of forced entry or exit from an aircraft via cutting, prying, explosives, or the like.

Additionally, various emergency systems can be configured for simulation and minimal reset time, which can be desirable for quickly repeating simulations multiple times. For example, emergency systems in real aircraft such as evacuation slides and oxygen masks may be configured for only single use or require a substantial amount of effort to reset such systems. Accordingly, in various embodiments, the MAST can be configured for deployment and quick reset of simulated emergency systems such as an evacuation slide 190, oxygen masks, or the like. For example, some embodiments can provide for deployment of a plurality of oxygen masks from overhead compartments (which may include flowing gas to the masks), and then automated reset of the plurality of deployed masks such that the deployed masks are pulled up into the overhead compartment and compartment doors closed and ready for re-deployment. Similarly, some embodiments can include one or more evacuation slides that can be deployed and then quickly deflated and reset for a new simulation.

Some embodiments can include doors 118 and/or emergency exits 117 configurable for simulating such doors or exits being damaged, jammed, or the like. Additionally, in some embodiments, such elements can be modular or replaceable to allow for simulation of handling specific makes, models and airline-specific configurations of doors 118, emergency exits 117, or the like.

Various embodiments can be configured for simulating damaged or improperly configured seats. For example, in a crash or as a result of tampering, seats may be pushed forward, partially or fully disengaged from a floor mounting rail, or the like. Accordingly, some embodiments of a MAST 100 can comprise seats that can be easily configured to simulate such disengagement, damage or the like. For example, while seats of a real aircraft may be securely bolted to a floor rail, the MAST 100 can be configured with quick-release seats that allow one or more attachment points between a seat and the floor to be quickly and easily disengaged to simulate various seat misconfigurations.

In addition to physical simulation, the MAST 100 can be configured for visual or auditory simulation. For example, speakers can be positioned in various locations to simulate ambient noise for various simulations, including normal aircraft operation sounds, takeoff, landing, crash landing, talking of passengers, PA system announcements, screaming of passengers, fire, engine issues, bird strike, and the like. In some examples, speakers can be located in specific locations to simulate sounds of given elements (e.g., a speaker in an engine to simulate normal or problematic engine noise).

Additionally, screens, projections or other visual displays can be presented internally and/or externally. For example, in some embodiments, windows can comprise individual screens for presentations to users on the inside and/or outside of the MAST 100. In another example, a large screen or projection surface can be located inside or outside of the MAST 100 for displays that are viewable through windows 116, doors 118, and the like.

While various embodiments discussed relate to running of training simulations in or about the MAST 100, in various embodiments, the MAST 100 can be configured for use as a classroom and/or for recording and playback of simulations that have been run. For example, some embodiments can include audio/visual components such as white boards, screen, microphones, speakers and the like, which can allow a teacher or other presenter to address students, trainees, simulation actors, or the like, who may be seated in seats 314 or other suitable location. Such classroom or presentation elements may be configured to be hidden or stored within the MAST 100 so that such elements are not present during simulations, but can be easily and quickly deployed to covert the MAST 100 to a classroom setting. For example, white boards or screens can be hidden within simulated bulkheads 324 and then exposed for classroom use.

Additionally, it can be desirable to generate audio, visual and/or data recordings so that simulations can be analyzed, replayed or otherwise reviewed. For example, various embodiments can include one or more cameras that can record activity during simulations or teaching, which can then be replayed in a classroom configuration of the MAST 100 or other suitable location. Similarly, one or more microphones can be located about the MAST 100 record and provide playback of sound occurring during a simulation or teaching. Additionally, data can be generated by the MAST 100 during simulations and stored. For example, a control system (e.g., computing device) can record start and/or end time of a simulation and times and identities of actions, changes in states or completing objectives such as actuating a simulated fuel pump shutoff, extinguishing a fire, roll, pitch and/or yaw generated by an actuation system 170, deployment of oxygen masks, deployment of evacuation slides, input into a cockpit interface, and the like.

Accordingly, in various embodiments, the MAST 100 can comprise a computing system configured for various functions, including running simulations, recording simulations, playback of simulation data, control of an actuation system 170, control of simulated emergency systems (e.g., slide 190 and oxygen masks), control of simulated fire or smoke, power system control, lighting control, and the like.

It should be noted that in various embodiments, the MAST 100 is not operable for flight and/or is not constructed from an aircraft that was capable of flight. Additionally, it should be clear that various embodiments are not a ride for amusement such as a mobile ride that travels to fairs, carnivals and other events. Instead, various embodiments are intended to provide a simulation of an aircraft that is as real as practical instead of simulating an aircraft theme for a ride. For example, various embodiments of a MAST are more realistic than a carnival ride and lack elements that a carnival ride may include such as safety bars or harnesses for riders (aside from possibly seatbelts or harnesses that may be present in a real aircraft). Also, it should be clear that various embodiments are sized to emulate the size of elements of real aircraft being simulated or at least sized so that human participants can enter the internal cavity of the simulated aircraft body and use the elements therein in a way that simulates use of such elements in a real aircraft.

As discussed herein, embodiments of the MAST 100 can be any suitable size or shape and can be configured in various suitable ways. For example, some embodiments can comprise an aircraft body 110 having a length between 10 and 60 feet; 12 and 53 feet; 20 and 40 feet; 50 to 60 feet; 10 to 20 feet; and the like. The following examples are provided as illustrations of some specific embodiments and should not be construed to be limiting.

12-Foot MAST Example:

Some embodiments can include a 12-foot trailer with single or dual axel. Such embodiments can be fixed with mock aircraft entry door and mock aircraft windows. The interior can resemble a narrow body aircraft with 2 to 6 airline seats, overhead compartments, a small mock galley area or mock lavatory area. It could be used for passenger extraction training; removing non-compliant passengers from seats, and the like. It could also be used for passenger patient triage for first-responders working in the confined spaces present in regional jet designs.

24-Foot MAST Example:

Some embodiments can include a 24-foot MAST that has a dual axel with an affixed mock aircraft entry door and mock aircraft windows. The interior can resemble a narrow body aircraft with several airline seats, overhead compartments, a mock galley and mock lavatory. The interior seating can also be placed in sideways in some examples to resemble a large wide body aircraft seating configuration with a seating configuration of 3 seats/aisle/3 seats/aisle/3 seats setup, or a 2 seats/aisle/3 seats/aisle/2 seats configuration, or the like. This can allow individuals using the trainer to feel exposed to a larger aircraft with the mock seating arrangements. The trailer can also have pullouts from the exterior creating more space for the interior. The pullouts can be metal and can be on a metal rail system that expands from the inside out. The pullouts can also be on a roller system in some examples, which can provide the desired expansion. Both a metal rail system and a roller system can be manual and/or powered and/or any combination thereof.

The 24-foot trailer can resemble a mock aircraft fuselage with mock aircraft engines, and can include deployable wings which can be used for fire incident training. The deployable wings can be placed on a folding metal rail system or telescoping type, which after transportation to the destination can fold out from the rail or extend telescopically, and create a wing section for users to interact with.

The top of the mock fuselage can have replaceable metal piercing port holes to allow fire departments to utilize their fire-piercing nozzles while training for simulated fire incidents. These piercing port holes would be mounted with a frame and prevent the integrity of the MAST from being damaged during fire training.

53-Foot Trailer Example:

In some examples, a 53-foot trailer could resemble a mock aircraft fuselage with one or more of mock aircraft engines, folding or telescoping deployable wings, working aircraft exterior entry doors, emergency exits, emergency inflatable slides that can be deployed, and the like. The interior can be an interior mock aircraft design, with airline seats, mock galley area, mock cockpit area, mock passenger cabin area, mock aircraft lavatory area, and the like.

In various examples, the 53-foot trailer can be placed on movable platform which can allow the MAST to roll and pivot. This can create a unique environment for individuals immersing themselves inside the MAST. The MAST in some examples can pitch up and down, and/or roll left or right, to simulate various scenarios to expose the users to, such as a downed aircraft on an embankment and the like.

A Mast trailer design can also feature an expansion which expands and collapses from within itself. This design can allow the MAST to configure from a mock narrow body aircraft to a wide body aircraft.

Example MAST Passenger Shuttle:

In some embodiments, a passenger shuttle design can have a mock airline interior with mock airline galley, airline passenger seats, mock cockpit area, a mock lavatory area, and the like. A passenger shuttle design can allow users when on board to feel truly immersed in an airline jet environment.

MAST passenger shuttle bus and trailer configurations can also resemble a cargo aircraft design, or other desirable aircraft or vehicle design in further embodiments. A cargo aircraft interior can have a mock cockpit aircraft area, a mock cargo holding area, and the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment, and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent. Also, recitation of a given element does not necessarily imply that such an element is operable, non-operable, a close simulation, a crude simulation, or the like. For example, recitation of the term "engine" should not be construed to necessarily include or exclude a working engine, a simulation engine, an element that crudely represents an engine, an element that closely simulates an engine, or the like. Additionally, while various examples discussed herein include a mobile aircraft simulation tool, further embodiments may not be mobile, so the present disclosure should not be construed to be limiting.

What is claimed is:

1. A mobile aircraft simulation tool comprising:
a simulated aircraft body extending between a front end and rear end along a central axis X and having a length of between 10 and 60 feet, the simulated aircraft body being without a tail and being flat at the rear end and having a truncated flat front end without a nose, the simulated aircraft body including:
a plurality of windows,
one or more emergency exits,
one or more doors,
an internal cavity,
a cockpit portion at the front end within the internal cavity,
a galley within the internal cavity,
a lavatory within the internal cavity,
a passenger cabin within the internal cavity having a plurality of rows of seats separated by at least one aisle, and
a plurality of overhead bins within the internal cavity,
no more than one wing portion comprising a simulated wing and a simulated engine, the no more than one wing portions configured to extend from below the simulated aircraft body from a transportation configuration to a simulation configuration;
a mobile trailer having a plurality of tires and a trailer hitch; and
an actuation system having a plurality of fluidic cylinders extending between a portion of the mobile trailer that are configured to expand and contract to move the simulated aircraft body and no more than one wing portion, including generating simulated roll and pitch of the simulated aircraft body and the no more than one wing portions,
wherein the mobile aircraft simulation tool is configured to be collapsible such that the mobile aircraft simulation tool can be legally transported on public roads to a simulation location and configured to be expandable at the simulation location to a size that would not be legal for transportation on public roads.

2. The mobile aircraft simulation tool of claim 1, further comprising a fire-simulation system that can be configured to release and burn a combustible fluid in at least one of the simulated engines and the internal cavity of the simulated aircraft body.

3. The mobile aircraft simulation tool of claim 1, further comprising a plurality of replaceable piercing panels disposed on a top of the simulated aircraft body that allow for simulation of putting out a fire with a reinforced piercing fire nozzle by piercing through the replaceable piercing panels with the reinforced piercing fire nozzle and directing at least one of fluid or foam directly inside the internal cavity of the simulated aircraft body.

4. The mobile aircraft simulation tool of claim 1, further comprising:
one or more deployable evacuation slides configured for automated reset for re-deployment, and
a plurality of oxygen masks deployable from overhead compartments over the plurality of rows of seats and configured for automated reset of the plurality of deployed masks such that the plurality of deployed masks are pulled up into the overhead compartments and compartment doors are closed such that the plurality of oxygen masks are ready for re-deployment.

5. A mobile aircraft simulation tool comprising:
a simulated aircraft body extending between a front end and rear end along a central axis X and having a length of between 10 and 60 feet, the simulated aircraft body including:
a plurality of windows,
one or more doors,
an internal cavity, and
a passenger cabin within the internal cavity having a plurality of rows of seats;
one or more wing portions comprising a simulated wing and a simulated engine, the one or more wing portions configurable from a transportation configuration to a simulation configuration;
a mobile trailer; and
an actuation system configured to move the simulated aircraft body and the one or more wing portion, including generating at least one of simulated roll and pitch of the simulated aircraft body and the one or more wing portions,
wherein the mobile aircraft simulation tool is configured to be collapsible such that the mobile aircraft simulation tool can be legally transported on public roads to a simulation location and configured to be expandable at the simulation location to a size that would not be legal for transportation on public roads.

6. The mobile aircraft simulation tool of claim 5, wherein the simulated aircraft body is without a tail and is flat at the rear end and includes a truncated flat front end without a full nose.

7. The mobile aircraft simulation tool of claim 5, further comprising two or more of:
one or more emergency exits,
a cockpit portion at the front end within the internal cavity,
a galley within the internal cavity,
a lavatory within the internal cavity, and
a plurality of overhead bins within the internal cavity.

8. The mobile aircraft simulation tool of claim 5, wherein the one or more wing portions are configured to extend from below the simulated aircraft body.

9. The mobile aircraft simulation tool of claim 5, wherein the actuation system comprises a plurality of fluidic cylinders extending between a portion of the mobile trailer that are configured to expand and contract to generate the at least one of simulated roll and pitch of the simulated aircraft body and the one or more wing portions.

10. The mobile aircraft simulation tool of claim 5, wherein the plurality of rows of seats are separated by at least one aisle.

11. The mobile aircraft simulation tool of claim 5, further comprising a fire-simulation system can be configured to release combustible fluid in at least one of the simulated engine and the internal cavity of the simulated aircraft body.

12. The mobile aircraft simulation tool of claim 5, further comprising one or more replaceable piercing panels disposed on a top of the simulated aircraft body that allow for simulation of putting out a fire with a reinforced piercing fire nozzle by piercing through the one or more replaceable piercing panels with the reinforced piercing fire nozzle and directing at least one of fluid or foam directly inside the internal cavity of the simulated aircraft body.

13. A mobile aircraft simulation tool comprising:
a simulated aircraft body extending between a front end and rear end along a central axis X and having a length of between 10 and 60 feet, the simulated aircraft body including:
a plurality of windows,
one or more doors,
an internal cavity,
a passenger cabin within the internal cavity having a plurality of seats, and
an actuation system configured to move the simulated aircraft body, including generating at least one of simulated roll and pitch of the simulated aircraft body.

14. The mobile aircraft simulation tool of claim 13, further comprising one or more wing portions comprising a simulated wing, the one or more wing portions configurable from a transportation configuration to a simulation configuration.

15. The mobile aircraft simulation tool of claim 14, comprising no more than one wing portion.

16. The mobile aircraft simulation tool of claim 13, wherein the mobile aircraft simulation tool is configured to be collapsible such that the mobile aircraft simulation tool can be legally transported on public roads to a simulation location and configured to be expandable at the simulation location to a size that would not be legal for transportation on public roads.

17. The mobile aircraft simulation tool of claim 13, further comprising one or more of:
one or more emergency exits, a cockpit portion at the front end within the internal cavity,
a galley within the internal cavity,
a lavatory within the internal cavity, and
a plurality of overhead bins within the internal cavity.

18. The mobile aircraft simulation tool of claim 13, further comprising a fire-simulation system can be configured to release combustible fluid.

19. A mobile aircraft simulation tool comprising:
a simulated aircraft body extending between a front end and rear end along a central axis X and having a length of between 10 and 60 feet, the simulated aircraft body including:
a plurality of windows,
one or more doors,
an internal cavity,
a passenger cabin within the internal cavity having a plurality of seats, and
least one replaceable piercing panel disposed on a top of the simulated aircraft body that allows for simulation of putting out a fire with a reinforced piercing fire nozzle by piercing through the replaceable piercing panel with the reinforced piercing fire nozzle and directing at least one of fluid or foam directly inside the internal cavity of the simulated aircraft body.

* * * * *